April 2, 1957 W. FRITSCH 2,787,400
PRESSURE COOKERS
Filed May 20, 1952

INVENTOR:
Willy Fritsch
BY: Michael S. Striker

United States Patent Office 2,787,400
Patented Apr. 2, 1957

2,787,400

PRESSURE COOKERS

Willy Fritsch, Mettmann, Rhineland, Germany

Application May 20, 1952, Serial No. 288,901

Claims priority, application Germany May 21, 1951

3 Claims. (Cl. 220—46)

The present invention relates to pressure cookers and the like.

More particularly the present invention relates to a means for sealing the interior of the cooker and for maintaining the pressure within the same below a predetermined value.

In conventional pressure cookers, there is generally a sealing member located between the rims of the cover and pot therebeneath to seal the enclosed space. This sealing member is tightly pressed between these rims so that it is difficult to connect and disconnect the cover from the pot, and also this sealing ring is subject to considerable friction and wear when the cover is placed on and removed from the pot so that these conventional sealing members must be periodically replaced and often do not provide an efficient seal if they are not replaced in time. Moreover, it sometime happens that during use of such a conventional pressure cooker the sealing member falls at least partially into the interior of the pressure cooker so that not only does it fail to provide the desired seal but it also comes in contact with the contents in the pressure cooker and must then be cleaned.

Moreover, in conventional pressure cookers pressure indicators are provided which are quite expensive to manufacture since they require accurately fitting, sliding parts, and many of these indicate pressure by giving off various sounds, such as whistles and the like. The safety device on conventional pressure cookers, for maintaining the pressure therein below predetermined limits, also are fairly expensive since they require accurately formed parts, and moreover these generally are provided with openings which are easily stopped up by the material being cooked so that such safety devices do not work properly.

One of the objects of the present invention is to overcome the above disadvantages by providing a pressure cooker with a sealing means which is not subject to friction and wear during connection and disconnection of the cover and which does not make this connection and disconnection difficult to perform.

A further object of the present invention is to provide a sealing means which is of a very simple construction.

An additional object of the present invention is to provide a pressure cooker cover, having a sealing ring therein, with a means for maintaining this sealing ring out of contact with surfaces on which the cover may be placed.

Another object of the present invention is to provide a pressure cooker with a pressure indicator which is of an exceedingly simple and inexpensive construction and which gives a visual indication of the pressure and temperature within the cooker.

Yet another object of the present invention is to provide a pressure cooker with a pressure release means which also is of a very simple construction and which is not subject to defective performance as the result of clogged openings.

A still further object of the present invention is to provide a pressure release means of the above type which is capable of giving an audible indication that the pressure within the cooker has exceeded the desired value.

Also among the objects of the present invention is the provision of a pressure indicator and release means which are constructed so that the parts thereof may be easily replaced by parts of different sizes to adapt the pressure cooker for use at different altitudes.

With the above objects in view, the present invention mainly consists of a pressure cooker having a receptacle provided with an inner face and an open top surrounded by a rim portion. Adapted to be located over the receptacle is a cover having an inner face and an open bottom surrounded by a rim portion. Against the inner face of either the receptacle or cover there is located a clamping ring which fixes an endless annular strip to the inner face of the receptacle or cover, and this strip extends beyond the rim portion of the receptacle or cover so as to extend across the plane between the rim portions of the receptacle and cover to seal the interior of the pressure cooker, this strip preferably being made of a resilient, flexible material.

The cover is provided at the center thereof with an opening through which an elongated member extends, and this elongated member has fixed thereto, on the outside of the cover, an indicator member and, on the inside of the cover, a weight adapted to be lifted toward the opening by the pressure within the cooker so that the rising indicator member gives a visual indication of the pressure and temperature within the cooker.

This central opening in the cover is located in a dome-shaped portion of the cover formed with a plurality of bores passing therethrough and located along a circle extending about this dome-shaped portion, the latter being formed on the outside with an annular groove extending across these bores and having opposite side edges. A resilient ring is located about this groove and bears only against the side edges thereof so as to form with the groove an annular space communicating with the interior of the cooker through said bores formed in the dome-shaped portion of the cover.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
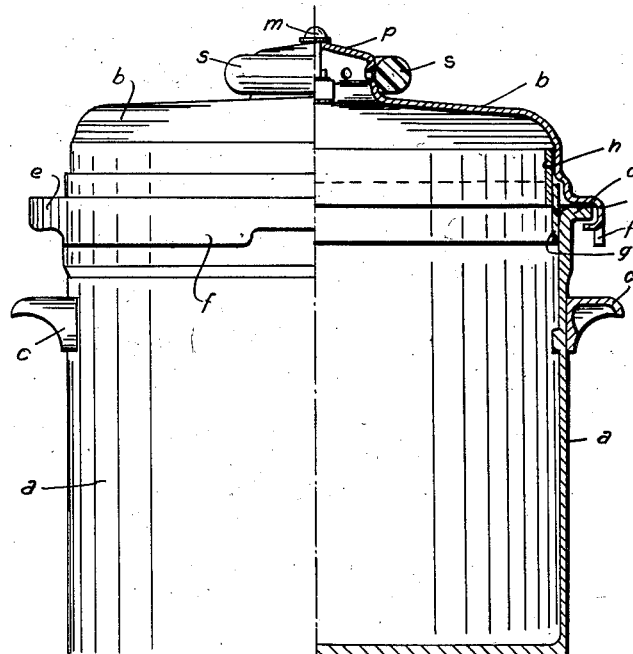
Fig. 1 is an elevational view, partly in section, of a pressure cooker constructed in accordance with the present invention.

Referring now to the drawings, there is shown in Fig. 1 the receptacle $a$ of a pressure cooker, this receptacle $a$ being made, for example, from rolled aluminum and having a pair of opposite handles $c$ fixed on the outside thereof. This receptacle $a$ is provided with a rim portion $d$ in the form of an outwardly extending annular flange which is interrupted at predetermined portions thereof.

Located over the receptacle $a$ of the pressure cooker shown in Fig. 1 is a cover $b$ having a rim $e$ in the form of a U-shaped channel having the lower wall thereof interrupted at predetermined portions corresponding to the interruptions in the rim $d$. These interruptions in the lower wall of the rim $e$ are preferably formed by downwardly struck portions $f$ for a purpose described below. Thus, the rims $d$ and $e$ cooperate to form a bayonet connection between the receptacle $a$ and cover $b$, and it is only necessary to slip the lower wall portions of the channel-shaped rim $e$ across the interruptions of the rim $d$, to locate this lower wall beneath the rim $d$, and to then turn cover $b$ with respect to the receptacle $a$ in order to connect the receptacle and cover to each other. It will be noted from the drawings that the channel $e$ has a width which is greater than the thickness of the rim $d$ so that the latter fits loosely within the channel-shaped rim $e$, and in fact the cover $b$ has an appreciable vertical play when it is connected to the receptacle $a$ so that there is absolutely no difficulty in connecting and disconnecting the cover $b$ and receptacle $a$.

Figure 2:
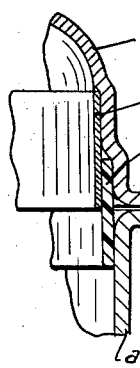
Fig. 2 is a fragmentary, sectional view of a part of the structure of Fig. 1.

As it is shown on a larger scale in Fig. 2, the cover $b$ has fixed to the inner face thereof a clamping ring $h$ which clamps to the inner face of the cover $b$ an annular, endless strip $g$ which extends, along the entire length thereof, beyond the rim portion $e$ so that when the cover $b$ is placed on the receptacle $a$, the strip $g$ extends across the plane between the rim portions $d$ and $e$ to provide a seal for the interior of the cooker. It will be noted that a sealing ring constructed in this manner does not present any difficulties in the connection and disconnection of the cover $a$ and receptacle $b$. Moreover, this strip $g$ is not subject to any friction and wear due to rubbing between the rims of the cover and receptacle of the cooker. The pressure within the cooker acts laterally on the strip $g$ to urge the same against the inner faces of the receptacle $a$ and cover $b$ adjacent and across the rims thereof so as to provide an effective seal in an exceedingly simple way. As was mentioned above, there is an appreciable vertical play between the cover $b$ and receptacle $a$, and this results in a slight raising of the cover $b$ when the pressure within the cooker increases shortly after heat is applied thereto. This slight raising of the cover is of a certain advantage since it gives the user an indication that the pressure within the cooker has increased appreciably.

It is apparent that the strip $g$ extending downwardly from the inner wall of the cover $b$ is likely to come in contact with flat surfaces on which the cover is placed, and such contact is undesirable since it might cause the strip $g$ to become dirty. In order to avoid this, the parts are so designed that the depending portions $f$ struck downwardly from the lower wall of the channel-shaped rim portion $e$ have lower free edges which are located beyond the lower free edge of the strip $g$ so that these depending portions $f$ contact such a flat surface and maintain the strip $g$ in an elevated position out of contact with such a surface.

Figure 3:
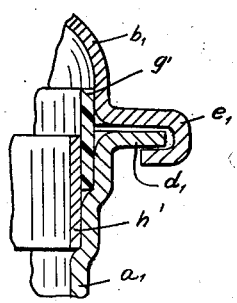
Fig. 3 is a fragmentary, sectional view of a different embodiment of the structure shown in Fig. 2.

It is also possible to connect the sealing strip to the receptacle, and such a construction is illustrated in Fig. 3 where the sealing strip $g'$, of the same construction as sealing strip $g$, is fixedly connected to the inner face of receptacle $a_1$ adjacent the rim $d_1$ thereof, of the same construction as receptacle $a$ and rim $d$, by means of a clamping ring $h'$ fixed to the inner wall of receptacle $a_1$. In this embodiment of the invention, the cover $b_1$ is of the same construction as the cover $b$ except that it does not have a clamping ring $h$ and sealing strip $g$ joined thereto. The channel-shaped rim $e_1$ thereof has interruptions in the lower wall thereof corresponding to the interruptions in the rim $d_1$ to provide a bayonnet connection but does not have depending portions since there is no sealing strip attached to the cover $b_1$ and therefore there is no need to provide a means for maintaining such a sealing strip out of contact with a flat surface.

The embodiment of Fig. 3 produces the same results as the embodiment of Figs. 1 and 2 since the sealing strip $g'$ extends across the plane between the rims $d_1$ and $e_1$ and is pressed against the inner walls of the receptacle $a_1$ and cover $b_1$ by the pressure within the cooker to seal the same. This sealing strip $g'$ also is not subject to any wear and friction during connection and disconnection of the cover $b_1$ and receptacle $a_1$, and the latter elements also have an appreciable play, as was described above in connection with the embodiment of Figs. 1 and 2.

Figure 4:
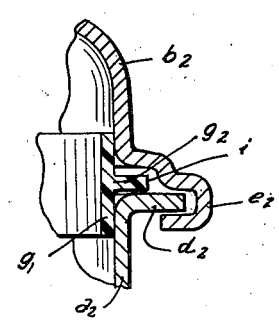
Fig. 4 is a fragmentary, sectional view of still another embodiment of the structure shown in Fig. 2.

In Fig. 4 of the drawings there is disclosed a further embodiment of the invention similar to those described above except that a clamping ring is not required to maintain the sealing strip in place. As is shown in Fig. 4, the sealing strip $g_1$ is provided with an annular projecting portion $g_2$ integral therewith and located over the rim $d_2$ of the receptacle $a_2$. As is the case with the embodiments of Figs. 2 and 3, the sealing strip of Fig. 4 is made of a resilient, flexible material, such as rubber or the like, but it has an appreciable resistance to bending so that the annular portion $g_2$ need only rest on the rim $d_2$ to maintain the sealing strip $g_1$ in position. The cover $b_2$ is different from the cover $b_1$ only in that the channel-shaped rim $e$ is formed with an additional annular, recessed portion forming with the rim $d_2$ a groove $i$ in which the annular member $g_2$ is loosely located, as illustrated in Fig. 4. Thus, the embodiment of Fig. 4 is capable of producing all of the results produced by the above described embodiments, since the strip $g_1$ extends across the plane between the rims $d_2$ and $e_2$ and moreover does not produce any frictional resistance to connection and disconnection of members $a_2$ and $b_2$ since the annular member $g_2$ is loosely located within the groove $i$. With the embodiment of Fig. 4, the pressure within the cooker presses the resilient strip $g_1$ against the inner walls of receptacle $a_2$ and cover $b_2$ to seal the interior of the cooker.

Figure 5:
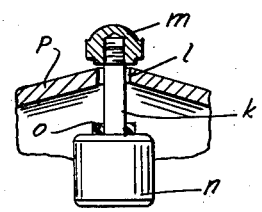
Fig. 5 is a fragmentary, partly sectional view of another part of the structure shown in Fig. 1.

All of the above described embodiments of the invention are adapted to be combined with a pressure and temperature indicating means of the construction shown in Fig. 1 and illustrated on an enlarged scale in Fig. 5. Thus, the cover of the pressure cooker is provided at the center thereof with an opening $l$ passing therethrough, and an elongated member $k$ passes through this opening, as illustrated in Fig. 5. Threadedly connected to the member $k$, on the outside of the cover, is an indicator $m$, and removably connected to the member $k$, as by threading or the like, on the inside of the cover, is a weight $n$ which is raised by the pressure within the cooker so that the indicator $m$ also rises and gives a visual indication of the pressure and temperature within the cooker. Located about the member $k$ on the weight $n$ is a sealing ring $o$ of a larger size than the opening $l$ so as to seal the latter from the interior of the cooker when the pressure therein rises sufficiently to move the weight $n$ to a position directly beneath the opening $l$. The simply constructed pressure indicator shown in Fig. 5 is of a particular advantage in giving a visual rather than an audible indication, because where a plurality of pressure cookers are used simultaneously it is not easy to determine which of them is giving an audible signal, but this difficulty is completely avoided where a visual indication is provided.

Figure 6:
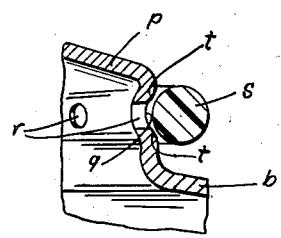
Fig. 6 is a fragmentary sectional view of still another part of the structure shown in Fig. 1.

The opening $l$ in the central part of the cover is located in a dome-shaped portion $p$ also located at the center of the cover, and this dome-shaped portion $p$ may function as a knob for handling the cover and is provided with a plurality of bores $r$, as shown in Fig. 6 on an enlarged scale, which are arranged along a circle extending about this dome-shaped portion $p$. The outside of this dome-shaped portion $p$ is formed with an annular groove $q$ extending across the bores $r$ and having opposite side edges $t$. Located about the groove $q$ is a resilient ring $s$, made of rubber or the like, which bears only against the side edges $t$ of the groove $q$ so as to provide with this groove $q$ an annular space communicating with the interior of the cooker through the bores $r$. These bores $r$ are of a particular advantage since if some of them should happen to become clogged with food particles or the like, the remaining unclogged bores $r$ will still provide adequate communication between the groove $q$ and the interior of the container to assure the proper functioning of the pressure release means.

Figure 7:
Fig. 7 is a sectional view of a different embodiment of an element shown in Fig. 6.

As is shown in Fig. 7, a coil spring $u$ may be embedded within a ring $s'$, similar to ring $s$, to cause the latter to bear with the desired force against the edges $t$.

The resilient ring, $s$ or $s'$, which may be made of rubber or the like, is designed to press against the edges $t$ with a force slightly greater than the force required to raise the weight $n$ to a position directly beneath the opening $l$. For example, if the temperature within the cooker is 102° C. when the weight $n$ is raised sufficiently to close the opening $l$, the ring $s$ would bear against the edges $t$ with a force requiring a temperature of 105° C. within the cooker to move a part of the ring $a$ from a part of an edge $t$, and in this particular example the cooking during normal operation of the apparatus would take place between 102° C. and 105° C.

When the pressure within the cooker rises above the predetermined upper value for which the cooker is designed, the steam escaping through one or more bores $r$ will move a part of the ring $s$ from a part of an edge $t$ and will produce a whistling sound so as to give an audible indication that too much heat has been applied to the cooker.

In addition to the advantages produced by the simplicity of the above described parts, the removable weight $n$ and the mounting of the ring $s$ are particularly advantageous since these elements may be replaced by a different weight $n$ and a different ring $s$, so that it is a simple matter to adapt the cooker for use at high altitudes, for example, and thus the disclosed cooker is easily adapted for use on trips to the mountains and the like.

It will be understood that each of the elements, described above, or two or more together, may also find a useful application in other types of pressure cookers differing of the types described above.

While the invention has been illustrated and described as embodied in pressure cookers having sealing means which is not subject to friction and wear, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A pressure cooker comprising, in combination, a receptacle member having an inner face and an open top surrounded by a radially outwardly extending flange; an endless strip of flexible material located next to said inner face of said receptacle member and extending axially beyond said flange thereof; an annular ring portion connected to and extending radially outward from said strip and overlapping said flange of said receptacle member to engage said flange for maintaining said strip on said receptacle member, said ring portion being of a substantially smaller diameter than said flange; and a cover member having an inner face adapted to be engaged by said strip when said cover member is in its covering position on said receptacle member, so that said strip seals the space enclosed by said receptacle and cover members, said cover member having an outwardly extending flange, at least one of said flanges being stepped and having an inner annular portion substantially parallel to the other of said flanges and spaced therefrom by a distance greater than the thickness of said annular ring portion and an outer annular portion engaging said other flange, said one flange having an annular connecting portion interconnecting said inner and outer annular portions thereof, whereby said flanges engage each other and form between themselves an annular space which in axial direction has a length exceeding the axial thickness of said ring portion.

2. A pressure cooker as defined in claim 1 and wherein said one stepped flange forms part of said cover member.

3. A pressure cooker comprising, in combination, a receptacle member having an inner face and an open top surrounded by a radially outwardly extending flange; an endless strip of flexible material located next to said inner face of said receptacle member and extending axially beyond said flange thereof; an annular ring portion connected to and extending radially outward from said strip and overlapping said flange of said receptacle member to engage said flange for maintaining said strip on said receptacle member, said ring portion being of a substantially smaller diameter than said flange; and a cover member having an inner face adapted to be engaged by said strip when said cover member is in its covering position on said receptacle member, so that said strip seals the space enclosed by said receptacle and cover members, said cover member having an outwardly extending flange, one of said flanges being stepped and having an inner annular portion substantially parallel to the other of said flanges and spaced therefrom by a distance greater than the thickness of said annular ring portion and an outer annular portion engaging said other flange, said one flange having an annular connecting portion interconnecting said inner and outer annular portions thereof, whereby said flanges engage each other and form between themselves an annular space which in axial direction has a length exceeding the axial thickness of said ring portion, said outer annular portion of said one flange being spaced radially outwardly from said endless strip by a radial distance greater than the radial width of said annular ring portion so that said annular space has an outside diameter greater than the outside diameter of said ring portion.

References Cited in the file of this patent

UNITED STATES PATENTS

| | | |
|---|---|---|
| 2,277,824 | Franson | Mar. 31, 1942 |
| 2,355,150 | De Simone | Aug. 8, 1944 |
| 2,372,227 | Sanford | Mar. 27, 1945 |
| 2,399,115 | Hansen et al. | Apr. 23, 1946 |
| 2,403,364 | Hertzell et al. | July 2, 1946 |
| 2,472,620 | Rhodes et al. | June 7, 1949 |
| 2,608,318 | Keller | Aug. 26, 1952 |

FOREIGN PATENTS

| | | |
|---|---|---|
| 254,205 | Switzerland | May 16, 1949 |